United States Patent
Hardy et al.

(10) Patent No.: US 10,725,776 B2
(45) Date of Patent: Jul. 28, 2020

(54) REDUCING A RATE AT WHICH REQUESTS ARE SENT FROM ONE PROCESSOR TO ANOTHER TO REDUCE PROCESSOR UTILIZATION AT THE PROCESSOR RECEIVING THE REQUESTS

(71) Applicant: INTERNATIONAL BUSINESS MACHINES CORPORATION, Armonk, NY (US)

(72) Inventors: Clint A. Hardy, Tucson, AZ (US); Matthew G. Borlick, Tucson, AZ (US); Adrian C. Gerhard, Rochester, MN (US); Lokesh M. Gupta, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/829,715

(22) Filed: Dec. 1, 2017

(65) Prior Publication Data
US 2019/0171451 A1 Jun. 6, 2019

(51) Int. Cl.
*G06F 9/30* (2018.01)
*G06F 3/06* (2006.01)
*G06F 11/20* (2006.01)

(52) U.S. Cl.
CPC ........ *G06F 9/30003* (2013.01); *G06F 3/0611* (2013.01); *G06F 3/0613* (2013.01);
(Continued)

(58) Field of Classification Search
CPC .............. G06F 9/30003; G06F 3/0611; G06F 11/2069; G06F 3/0619
See application file for complete search history.

(56) References Cited

U.S. PATENT DOCUMENTS 5,680,539 A  10/1997  Jones
5,684,696 A  11/1997  Rao et al.
(Continued)

FOREIGN PATENT DOCUMENTS

CN  103345450 A  10/2013
WO  2017034610 A1  3/2017

OTHER PUBLICATIONS

Office Action dated Nov. 23, 2018, pp. 18, for U.S. Appl. No. 15/829,706.
(Continued)

*Primary Examiner* — Matthew M Kim
*Assistant Examiner* — Indranil Chowdhury
(74) *Attorney, Agent, or Firm* — David W. Victor; Konrad Raynes Davda & Victor

(57) ABSTRACT

Provided are a computer program product, system, and method for reducing a rate at which requests are sent from one processor to another to reduce processor utilization at the processor receiving the requests. A determination is made as to whether processor utilization at the first processor exceeds a utilization threshold. If so, a determination is made as to whether a specified operation is in progress in response to determining that the processor utilization at the first processor exceeds the utilization threshold. The first processor sends a message to the second processor to cause the second processor to reduce a rate at which requests are transferred from the second processor to the first processor in response to determining that the specified operations is in progress.

17 Claims, 6 Drawing Sheets

(52) U.S. Cl.
CPC .......... *G06F 3/0619* (2013.01); *G06F 3/0659* (2013.01); *G06F 3/0665* (2013.01); *G06F 3/0689* (2013.01); *G06F 11/2069* (2013.01); *G06F 2201/805* (2013.01); *G06F 2201/82* (2013.01); *G06F 2206/1012* (2013.01)

(56) References Cited

U.S. PATENT DOCUMENTS

| | | | |
|---|---|---|---|
| 5,822,584 | A | 10/1998 | Thompson et al. |
| 6,647,514 | B1 | 11/2003 | Umberger et al. |
| 7,016,985 | B2 | 3/2006 | Johnson |
| 7,062,768 | B2 * | 6/2006 | Kubo .................. G06F 9/505 709/223 |
| 7,139,931 | B2 | 11/2006 | Horn |
| 7,529,836 | B1 * | 5/2009 | Bolen .................. G06F 3/0611 709/226 |
| 7,721,292 | B2 * | 5/2010 | Frasier .................. G06F 9/505 709/226 |
| 8,699,452 | B2 * | 4/2014 | Sarkar .................. H04W 72/1226 370/331 |
| 8,738,880 | B2 | 5/2014 | Grusy et al. |
| 8,751,861 | B2 | 6/2014 | Nair et al. |
| 8,874,868 | B2 * | 10/2014 | Baptist .................. H04L 9/085 711/114 |
| 2009/0210618 | A1 | 8/2009 | Bates et al. |
| 2009/0313617 | A1 | 12/2009 | Hung |
| 2013/0054891 | A1 | 2/2013 | Kawaguchi |
| 2013/0318297 | A1 | 11/2013 | Jibbe et al. |
| 2015/0301894 | A1 | 10/2015 | Dennett et al. |
| 2018/0113640 | A1 | 4/2018 | Fernandez et al. |
| 2019/0171363 | A1 | 6/2019 | Hardy et al. |
| 2019/0171509 | A1 | 6/2019 | Hardy et al. |
| 2019/0332457 | A1 | 10/2019 | Hardy et al. |
| 2019/0391889 | A1 | 12/2019 | Luo et al. |

OTHER PUBLICATIONS

Response dated Feb. 26, 2019, pp. 13, to Office Action dated Nov. 23, 2018, pp. 18, for U.S. Appl. No. 15/829,706.
English translation of CN103345450A filed Oct. 9, 2013, [online] [Nov. 22, 2017] https://patents.google.com/patent/CN103345450A/en?language=ENGLISH.
U.S. Appl. No. 15/829,701, filed Dec. 1, 2017.
U.S. Appl. No. 15/829,706, filed Dec. 1, 2017.
List of IBM Patents or Patent Applications Treated as Related, dated Dec. 1, 2017, pp. 2.
Final Office Action dated Jun. 10, 2019, pp. 27, for U.S. Appl. No. 15/829,706.
J. Lala, et al., "Architectural Principles for Safety-Critical Real-Time Applications", Proceeding of the IEEE, vol. 82, No. 1, Jan. 1994, pp. 16.
Notice of Allowance, dated May 1, 2019, for U.S. Appl. No. 15/829,701, filed Dec. 1, 2017, Total 24 pages.
Response dated Aug. 13, 2019, pp. 9, to Final Office Action dated Jun. 10, 2019, pp. 27, for U.S. Appl. No. 15/829,706.
Notice of Allowance dated Sep. 25, 2019, pp. 15, for U.S. Appl. No. 15/829,706.
U.S. Appl. No. 16/508,291, filed Jul. 10, 2019.
Preliminary Amendment dated Jul. 10, 2019, pp. 8, for U.S. Appl. No. 16/508,291, filed Jul. 10, 2019.
List of IBM Patents or Patent Applications Treated as Related, dated Aug. 20, 2019, pp. 2.
Notice of Allowance dated Jan. 15, 2020, p. 14, for U.S. Appl. No. 15/829,706.
U.S. Appl. No. 16/735,654, filed Jan. 6, 2020.
Preliminary Amendment dated Jan. 6, 2020, p. 7.
List of IBM Patents and Applications Treated as Related, p. 2, Jan. 30, 2020.
Notice of Allowance dated Feb. 20, 2020, p. 34, for U.S. Appl. No. 16/508,291.

* cited by examiner

REDUCING A RATE AT WHICH REQUESTS ARE SENT FROM ONE PROCESSOR TO ANOTHER TO REDUCE PROCESSOR UTILIZATION AT THE PROCESSOR RECEIVING THE REQUESTS

BACKGROUND OF THE INVENTION

1. Field of the Invention

The present invention relates to a computer program product, system, and method for reducing a rate at which requests are sent from one processor to another to reduce processor utilization at the processor receiving the requests.

2. Description of the Related Art

In a storage controller, drives can fail in a Redundant Array of Independent Disks (RAID) array. When a drive fails in a RAID array, the storage controller will swap in a new drive and rebuild the RAID array from parity and/or redundancy data along with data on remaining drives. Rebuilding a RAID array is a processor intensive operation which can saturate the processors on the device adapter managing access to the drives in the RAID array. If the RAID array is experiencing large Input/Output (I/O) request traffic, then the rebuild operation may be delayed as the device adaptor has to divert processor resources to processing the I/O requests. If the rebuilding of the RAID array is delayed, then during this time there is a risk that if a failure of another disk occurs, the data in the RAID drives may not be able to be recovered if the number of failed drives exceeds the RAID fault tolerance.

Thus, there is a need in the art for improved techniques to manage I/O requests at a processor that is also performing an ongoing critical operation, such as rebuilding a RAID array.

SUMMARY

Provided are a computer program product, system, and method for reducing a rate at which requests are sent from one processor to another to reduce processor utilization at the processor receiving the requests. A determination is made as to whether processor utilization at the first processor exceeds a utilization threshold. If so, a determination is made as to whether a specified operation is in progress in response to determining that the processor utilization at the first processor exceeds the utilization threshold. The first processor sends a message to the second processor to cause the second processor to reduce a rate at which requests are transferred from the second processor to the first processor in response to determining that the specified operations is in progress.

DETAILED DESCRIPTION

As discussed, a processor, such as a device adaptor, may have to continually process I/O requests even while having to complete an important operation, such as rebuilding a RAID array. Described embodiments provide techniques to throttle the I/O requests directed to a device adaptor to allow more device adaptor processor resources to be used to complete rebuilding the RAID array. With the described embodiments, risk of data loss is reduced by allowing the operation in progress, such as rebuilding a RAID array, to complete faster, before other drives fail and the data cannot be recovered. Further, by reducing the I/O request rate during the RAID rebuild operation, the drives experience less stress, which reduces the risk the drives will fail during the rebuild operation.

Described embodiments improve the computer technology for managing the transmission of requests from one processor to another processor, by providing techniques to allow the processor receiving to throttle the request transmission rate from the sending processor if the receiving processor is also performing a critical task such that extended delays in completing the tasks, such as rebuilding a RAID array, increases the risk of data loss.

Figure 1:
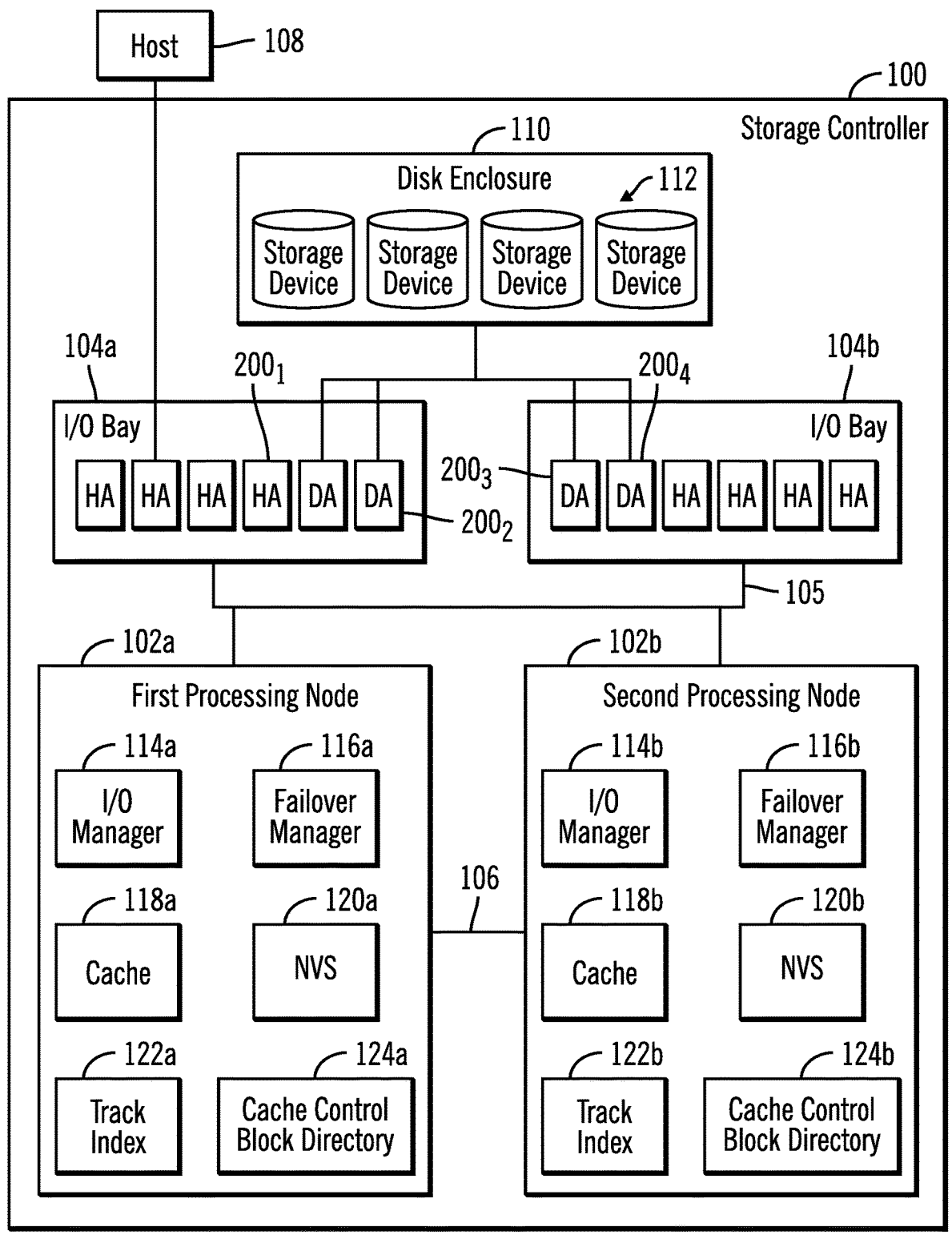
FIG. 1 illustrates an embodiment of a storage controller.

FIG. 1 illustrates an embodiment of a storage controller 100 including a plurality of independent processing nodes 102a,102b, such as a central electronics complex (CEC), that each connect to Input/Output (I/O) bays 104a, 104b having device adaptors (DA) and hardware adaptors (HA) therein, over a bus interface 105, such as a Peripheral Component Interconnect Express (PCIe) bus. The processing nodes 102a, 102b may also communicate with each other directly over a link 106, such as a PCIe bus. Host systems, such as host 108, may connect to the storage controller 100 through a host adaptor (HA) in the I/O bays 104a, 104b.

A storage array 110 includes a plurality of storage devices 112 in which logical volumes and tracks are configured. Each processing node 102a, 102b is assigned one of the device adaptors in each of the I/O bays 104a, 104b that connect to the storage array 110 to provide access to data configured in the storage devices 112. Each processing node 102a, 102b has a default configuration to communicate with a device adaptor (DA) $200_1$, $200_2$, $200_3$, $200_4$ in one of the I/O bays 104a, 104b, where the default configuration will assign the different processing nodes 102a, 102b to device adaptors in the I/O bays 104a, 104b.

Each processing node 102a, 102b includes an I/O manager 114a, 114b to manage I/O requests from attached hosts to storage space configured in the storage devices 112 of the storage array 110, and perform other related operations, such as path selection and error handling. Each processing node 102a, 102b further maintains a failover manager 116a, 116b to determine whether to failover to the other processing node 102a, 102b or to failover from a currently used device adaptor (DA) $200_1$, $200_2$, $200_3$, $200_4$ in one of the I/O bays 104a, 104b to the other of the device adaptors (DA) $200_1$, $200_2$, $200_3$, $200_4$ in the other of the I/O bays 104b, 104a.

Each processing node 102a, 102b further includes a cache 118a, 118b to cache tracks from the storage devices 112 and a non-volatile storage ("NVS") 120a, 120b to provide a backup storage of modified tracks in the other cache 118b, 118a, respectively. In this way, NVS 120a provides backup storage of the tracks in cache 118b and NVS 120b provides backup storage of the tracks in cache 118a. If the tracks in a cache 118a, 118b become corrupted or are lost, then they may be restored from the NVS 120b, 120a providing the backup storage. Because each processing node 102a, 102b may be on a separate power boundary, the NVS 120a, 120b in one processing node 102a, 102b provides backup storage for the modified tracks in the cache 118b, 118a of the other processing node 102b, 102a to be made available in case the other processing node experiences failure or data loss/corruption.

Each processing node 102a, 102b maintains in memory a track index 122a, 122b providing an index of tracks in the respective cache 118a, 118b to cache control blocks in a control block directory 124a, 124b. The control block directory 124a, 124b includes the cache control blocks, where there is one cache control block for each track in the cache 118a, 118b providing metadata on the track in the cache 118a, 118b. The track index 122a, 122b associates tracks with the cache control blocks providing information on the tracks in the cache 118a, 118b.

In the embodiment of FIG. 1, two redundant processing nodes 102a, 102b and two I/O bays 104a, 104b are shown. In further embodiments, there may be more than the number of shown redundant elements 102a, 102b, 104a, 104b, to provide additional redundancy.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 112 in the storage array 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 112 in the storage array 110 may comprise heterogeneous storage devices from different vendors and different types of storage devices, such as a first type of storage devices, e.g., hard disk drives, that have a slower data transfer rate than a second type of storage devices, e.g., SSDs.

The caches 118a, 118b may comprise a byte addressable write-in-place memory device, where data is updated by overwriting the previous version of the data with the new version, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc. The non-volatile storage ("NVS") 120a, 120b may comprise a non-volatile copy-on-write memory device where a new version of the data is written to a new location in the storage, such as NAND storage, e.g., flash memory, Solid State Drive (SSD) storage, etc. Other non-volatile devices may be used for the non-volatile storage 120a, 120b, such as a battery backed-up DIMM.

The components, such as the I/O managers 114a, 114b, host adaptors (HA), and device adaptors (DA) $200_1$, $200_2$, $200_3$, $200_4$ may be implemented in computer readable program instructions in a computer readable storage medium executed by a processor and/or computer hardware, such as an Application Specific Integrated Circuit (ASIC).

Figure 2:
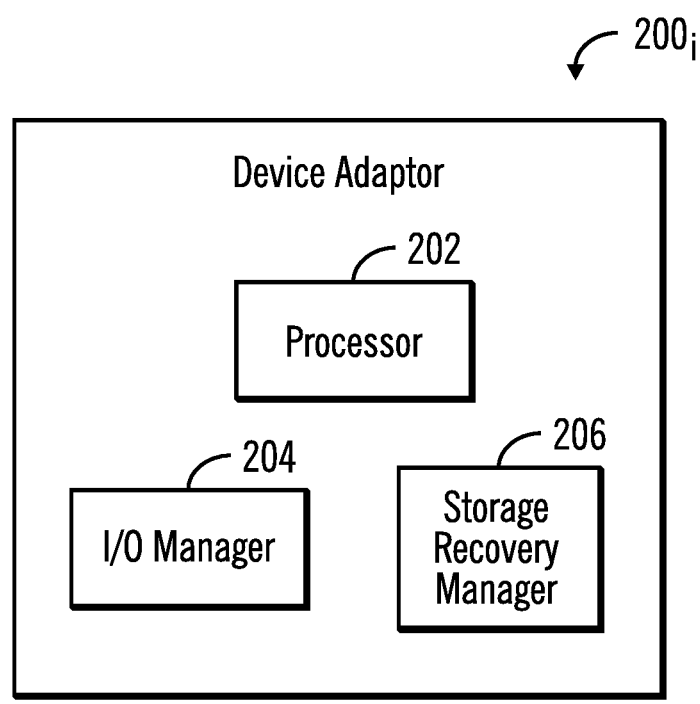
FIG. 2 illustrates an embodiment of a device adaptor.

FIG. 2 illustrates an embodiment of a device adaptor $200_i$, such as one of the device adaptors $200_1$, $200_2$, $200_3$, $200_4$, including a processor 202, such as one or more processor devices, an I/O manager 204 executed by the processor 202 to manage the execution of I/O requests from one of the processor nodes 102a, 102b, with respect to the storage devices 112, and a storage recovery manager 206 to recover from a failure at one of the storage devices 112. In embodiments where one or more RAID arrays, or other logical storage units, are configured in the storage array 110, the storage recovery manager 206 may rebuild a RAID array in available storage devices 112, if one or more of the storage devices fail, using parity and/or redundancy data to reconstruct data on the failed storage devices 112. In RAID embodiments, the I/O manager 204 may include RAID algorithms to stripe data across the storage devices 112 and generate parity or redundancy data to stripe on the storage devices 112, where the parity data is used if one or more storage devices in which the RAID array fails. Various RAID levels use parity or various forms of redundancy data to recreate data in the event of one or more failures. The term "parity" refers to, without limitation, any form of redundancy data such as XOR parity, Reed-Solomon encoded redundancy data, ECC, etc. that is applicable for a given RAID implementation.

Figure 3:
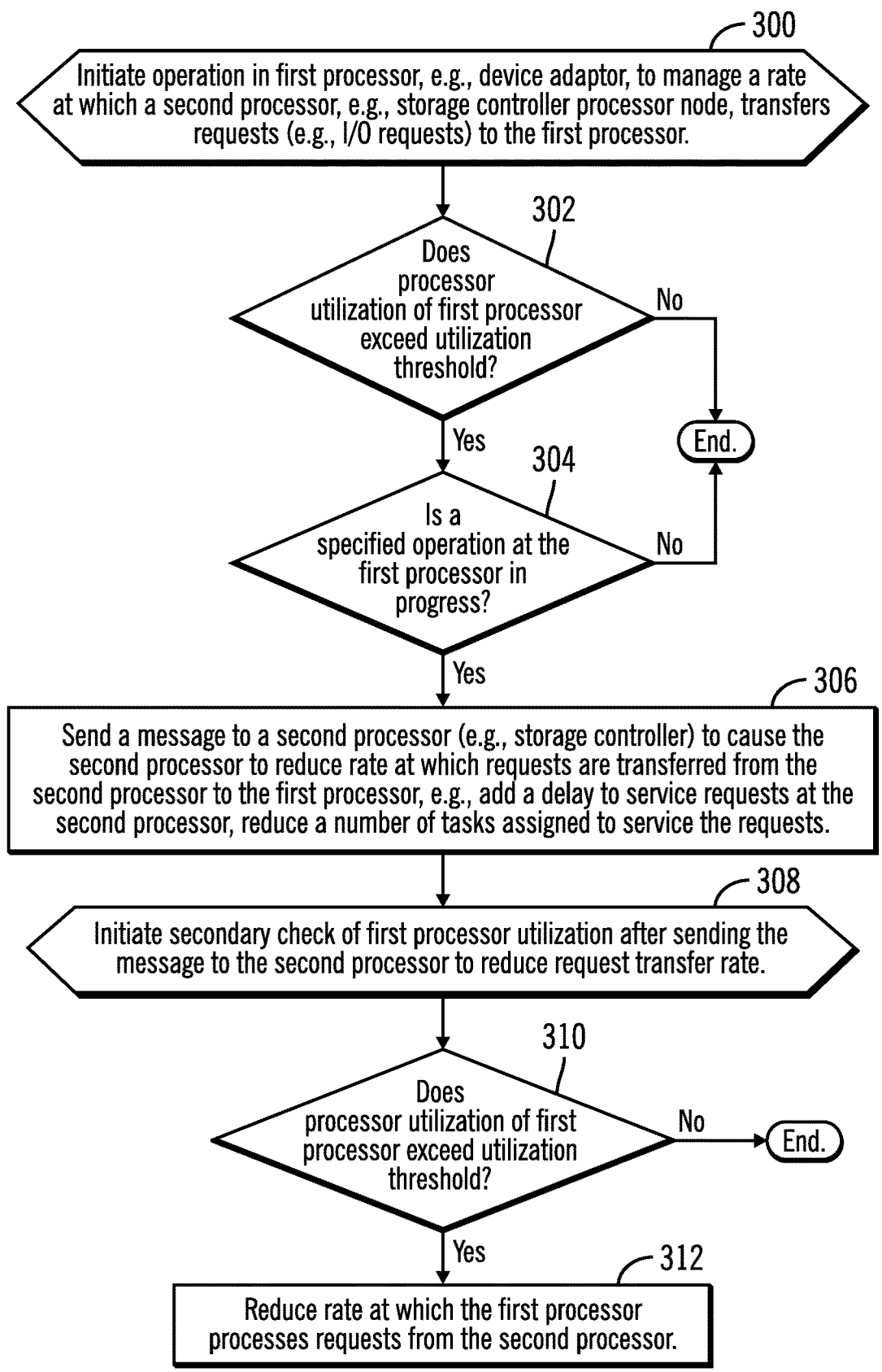
FIG. 3 illustrates an embodiment of operations for a first processor to manage a rate at which a second processor transfers requests to the first processor.

FIG. 3 illustrates an embodiment of operations performed in a first processor, such as a device adaptor $200_i$, to manage the rate at which requests, such as I/O requests, are transferred from a second processor, such as a processor node 102a, 102b, e.g., cluster, in a storage controller 100, to the first processor. Upon initiating (at block 300) operations to manage rate of requests, the first processor determines (at block 302) whether a processor utilization, such as at the processor 202, exceeds a utilization threshold. If (at block 302) the threshold is exceeded and if (at block 304) a specified operation at the first processor is in progress, which may comprise a critical operation, such as rebuilding a RAID array in a failed disk drive, operating in failover mode to handle requests for a failed processor, etc., then the first processor sends (at block 306) a message to the second processor (e.g., storage controller) to cause the second processor to reduce the rate at which requests are transferred from the second processor to the first processor. In certain embodiments, the message may cause the second processor to reduce the rate of transferring requests by at least one of add a delay to service requests at the second processor and reduce a number of tasks in the second processor assigned to service the requests. The message may further cause the second processor to reduce the number of overlapped I/O requests sent to the first processor.

After an interval following the sending of the message to cause the second processor to reduce the rate at which request are transferred, the first processor may initiate (at block 308) a secondary check of the first processor utilization. As part of the secondary check, if (at block 310) the processor utilization of the first processor exceeds the utilization threshold, then the second processor reducing the rate of sending requests has not succeeded in reducing the burdens on processor utilization at the first processor. In such case, the first processor may reduce (at block 312) the rate at which the first processor processes the requests from the second processor or performs other operations to reduce the burdens on the processor 202.

With the described embodiments of FIG. 3, a first processor processing requests from a second processor and whose processor utilization is relatively high, may send a message to the second processor to reduce the rate at which the second processor transmits requests to the first processor to reduce processing burdens on the first processor while the first processor is performing a specified or critical operation, such as rebuilding a RAID array, or other storage array, handling excessive traffic as a result of a failover, etc. Reducing the burden of processing requests frees processor resources to allow the first processor to complete or continue with the specified operation without experiencing delays from high processor utilization resulting from I/O requests.

In one embodiment, the first processor may comprise a device adaptor $200_i$ and the second processor may comprise the storage controller processor nodes 102a, 102b. In alternative embodiments, different devices may function as the first and second processors of FIG. 3. For instance, one or both of the processor nodes 102a, 102b may comprise the first processor and the host adaptors (HA) shown in FIG. 1 may comprise the second processor forwarding I/O requests to the processor nodes 102a and/or 102b. In another embodiment, the first processor may comprise the host adaptors (HA) shown in FIG. 1 and the second processor may comprise the host 108. In yet further embodiments, other components in storage controllers and other computing devices may operate as the first and second processors.

Figure 4:
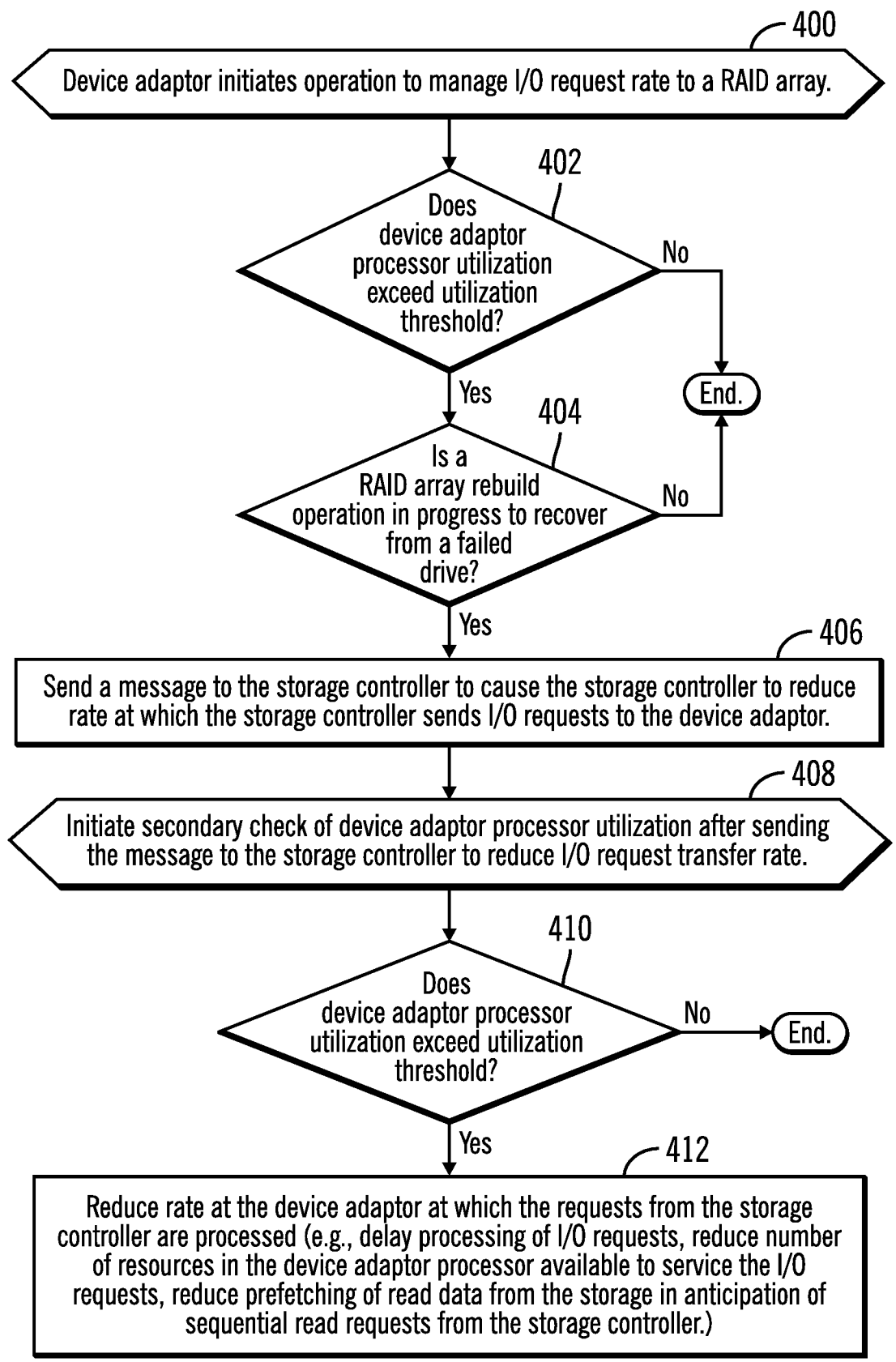
FIG. 4 illustrates an embodiment of operations for a device adaptor to manage a rate at which a storage controller processor node transfers I/O requests to the device adaptor.
Figure 5:
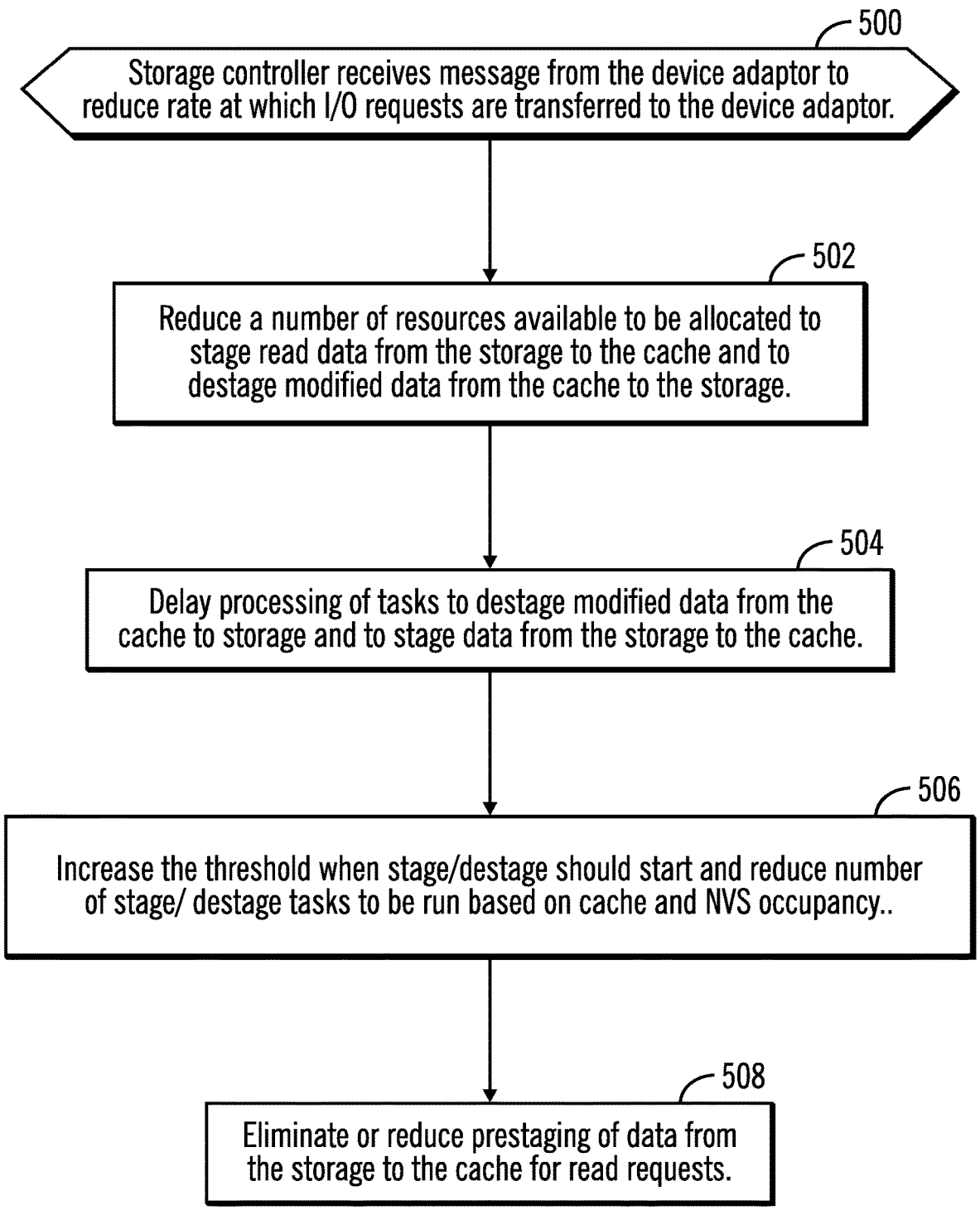
FIG. 5 illustrates an embodiment of operations performed by a storage controller to reduce the rate of I/O requests to the device adaptor.

FIG. 4 illustrates an embodiment of operations where the first processor comprises a device adaptor $200i$ and the second processor comprises a storage controller processor node 102a, 102b, and the specified operation in progress comprises an operation to rebuild a RAID array 110, or other type of storage array, on available storage devices to recover from a failed storage device 112 or when the device adaptor $200_i$ is operating in failover mode handling I/O requests for a failed device adaptor. The operations of FIG. 4 may be performed by the I/O manager 204 of the device adaptor $200_i$. Upon initiating (at block 400) an operation to manage rate of I/O requests, the device adaptor $200_i$ determines (at block 402) whether a processor 202 utilization at the device adaptor $200_i$ exceeds a utilization threshold. If (at block 402) the threshold is exceeded and if (at block 404) the RAID array 110 rebuild or failover mode (or other critical operation) at the device adaptor $200_i$ is in progress, then the device adaptor $200_i$ sends (at block 406) a message to at least one of the processor node 102a and/or 102b of the storage controller 100 sending I/O requests to the device adaptor $200_i$ to cause the processor node 102a and/or 102b to reduce rate at which I/O requests are transferred to the device adaptor $200_i$. FIG. 5 illustrates an embodiment of operations performed at the processor nodes 102a and/or 102b receiving such message form the device adaptor $200_i$.

At an interval following the sending of the message to cause the processor node 102a, 102b to reduce the rate at which I/O requests are transferred, the device adaptor $200_i$ may initiate (at block 408) a secondary check of the device adaptor processor 202 utilization. As part of the secondary check, if (at block 410) the processor utilization of the device adaptor processor 202 exceeds the utilization threshold, then the processor node 102a and/or 102b reducing the rate of sending I/O requests have not succeeded in reducing the burdens on device adaptor processor 202 utilization. In such case, the I/O manager 204 may reduce (at block 412) the rate at which the device adaptor processor 202 processes the I/O requests from the second processor or performs other operations to reduce the burdens on the processor 202, including, but not limited to, delay processing of I/O requests, reduce resources (e.g., threads or tasks, queues, queue depth, memory, etc.) in the device adaptor processor 202 available to service the I/O requests, reduce prefetching of read data from the storage in anticipation of sequential read requests from the storage controller 100.

FIG. 5 illustrates an embodiment of operations performed by the storage controller processor nodes 102a and/or 102b in response to receiving a message from the device adaptor $200_i$ to reduce the rate at which I/O request are transferred to the device adaptor $200_i$. Upon receiving (at block 500) the message, the processor node I/O manager 114a, 114b may perform one or more of the operations of 502, 504, 506, and 508. At block 502, the I/O manager 114a, 114b may reduce a number of resources, e.g., threads or tasks, queues, queue depth, memory, etc., available to be allocated to stage read data from the storage 110 to the cache 118a, 118b and to destage modified data form the cache 118a, 118b to the storage 110 to reduce the I/O traffic to the device adaptor $200_i$. At block 504, the I/O manager 114a, 114b may delay processing of tasks (e.g., threads) to destage modified data from the cache 118a, 118b to the storage 110 and to stage data from the storage 110 to the cache 118a, 118b to reduce the I/O traffic to the device adaptor $200_i$. At block 506, the I/O manager 114a, 114b may increase the threshold when stage/destage should start and reduce the number of stage/destage tasks to be run based on cache 118a, 118b and non-volatile storage (NVS) 129a 129b occupancy. At block 508, the I/O manager 114a, 114b eliminates or reduces prestaging of data from the storage 110 to the cache 118a, 118b in anticipation of read requests, such as sequential read requests, that will request the data.

With the embodiment of FIG. 5, the I/O managers 114a, 114b may take different actions to reduce the rate at which I/O requests are sent to the device adaptor $200_i$ to reduce processor utilization at the device adaptor $200_i$ from I/O requests so that more device adaptor processor 202 resources are available for the critical operation in progress, such as rebuilding a RAID array, handling a failover from another device adaptor, etc.

Figure 6:
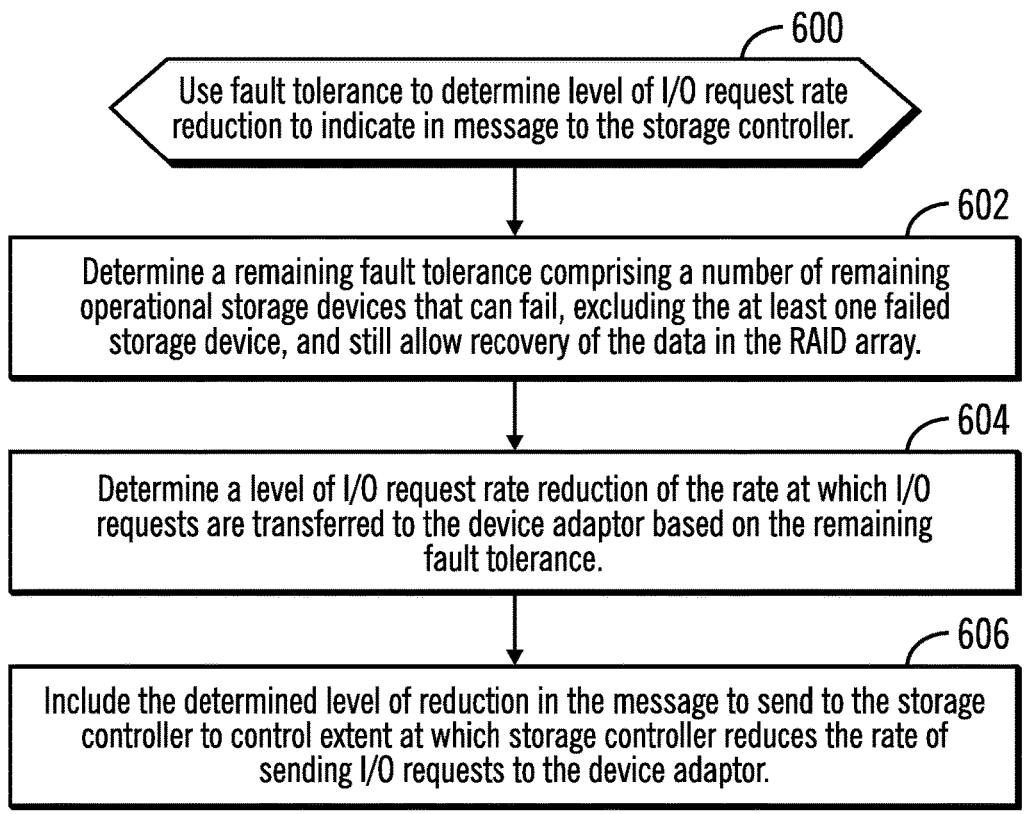
FIG. 6 illustrates an embodiment of operations for a device adaptor to consider fault tolerance of a RAID array in determining a level of I/O request reduction to send to the storage controller processor node.

FIG. 6 illustrates an embodiment of operations performed by the device adaptor I/O manager 204 to determine a level of I/O request rate reduction to indicate in the message to the processor nodes 102a and/or 102b based on fault tolerance of the RAID array 110, i.e., storage array, while the RAID array 110 is being rebuilt. For instance, RAID 6 provides double parity, or a fault tolerance of two storage drives, which means up to two drives in a RAID 6 array can fail and still allow recovery of the data from the parity data and data, such as customer data, on the remaining drives. Other RAID levels provide a fault tolerance of one drive, which means data can be recovered with one failed drive in the RAID array but cannot be recovered with multiple failed drives in the RAID array. Upon initiating (at block 600) the operation to consider remaining fault tolerance for the RAID array 110 being rebuilt, the device adaptor I/O manager 204 determines (at block 602) a remaining fault tolerance comprising a number of remaining operational storage devices 112, excluding the at least one failed storage device, that can fail and still allow recovery of the data in the RAID array 110. For instance, after the failure of one storage device 112 resulting in an ongoing RAID recovery operation, the remaining fault tolerance for RAID 6 may be one storage drive, because the initial fault tolerance was two drives, and for single parity RAID, such as RAID, 5, after the failure of one storage device, the remaining fault tolerance would be zero drives.

The I/O manager 204 determines (at block 604) a level of reduction of the rate at which I/O requests are transferred to the device adaptor 200$_i$ based on the remaining fault tolerance, where there may be different levels of reduction for different remaining fault tolerances, such as 0, 1 or 2 number of storage drives that can fail and still allow recovery after the recent failure. Thus, the I/O manager 204 maintains different levels of I/O request rate reductions for different remaining fault tolerances. For a lower level rate reduction, the processor node 102*a*, 102*b* would perform less aggressive rate reduction operations than for a higher level rate reduction. The device adaptor I/O manager 204 includes (at block 606) the determined level of I/O request rate reduction in the message to send to the storage controller processor nodes 102*a* and/or 102*b* to control the extent to which storage controller processor nodes 102*a*, 102*b* reduce the rate of sending I/O requests to the device adaptor 200$_i$.

With the operations of FIG. 6, the device adaptor causes the processor nodes 102*a* and/or 102*b* to determine a level of rate reduction based on the remaining fault tolerance. If the remaining fault tolerance is low, such as zero drives that can fail, then the device adaptor 200$_i$ would instruct the processor nodes 102*a* and/or 102*b* to engage in the highest level of I/O request transmission rate reduction to maximize the reduction in the load on the device adaptor processor 202 to allow the rebuilding of the RAID array 110 to complete as fast as possible. However, if the fault tolerance is higher, such as one or more, then the I/O request rate reduction may be less if fault tolerance is higher, because a single disk failure will not result in loss of data, so the device adaptor may handle more I/O requests and take longer to complete the rebuilding of the RAID array 110.

Figure 7:
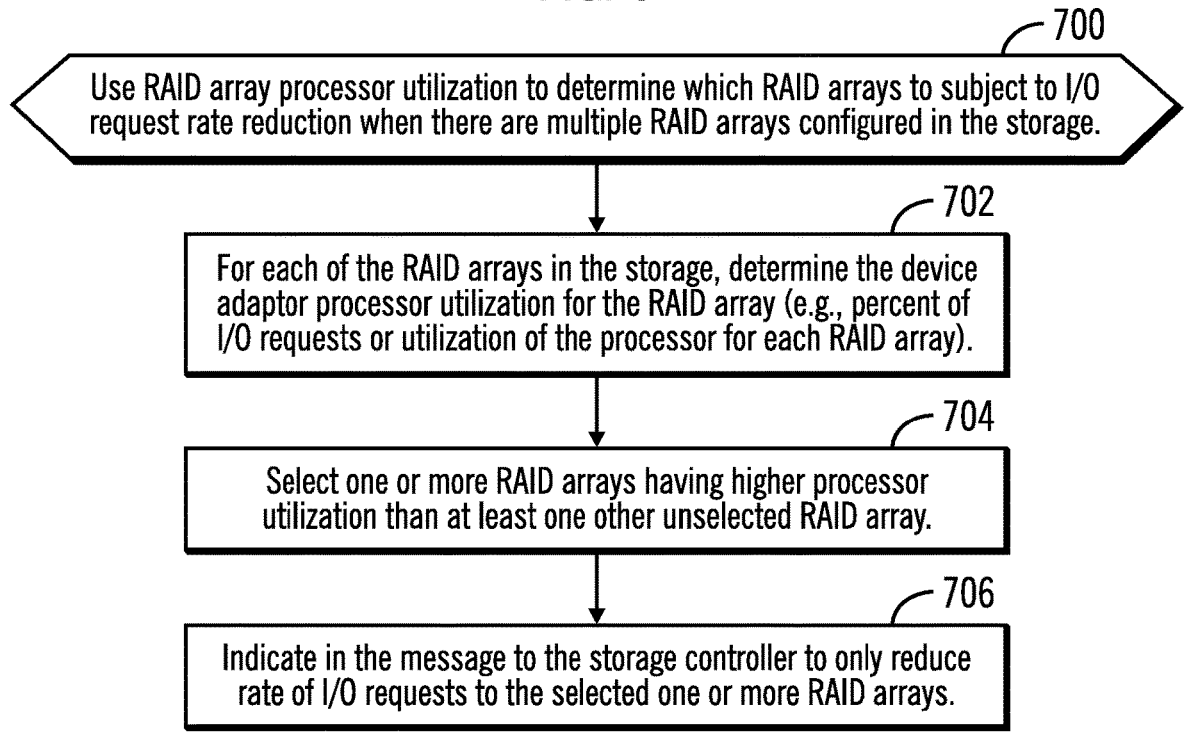
FIG. 7 illustrates an embodiment of operations for a device adaptor to determine RAID arrays to subject to I/O request rate reduction.

FIG. 7 illustrates an embodiment of operations performed by the device adaptor I/O manager 204 to determine content for the message to send to the processor nodes 102*a* and/or 102*b* to reduce I/O requests when there are multiple RAID arrays 110, or other types of logical storage units, configured in the storage 110. Upon initiating (at block 700) an operation to determine the content for the message to the storage controller processing nodes 102*a* and/or 102*b* when there are multiple RAID arrays, the device adaptor I/O manager 204 determines (at block 702), for each of the RAID arrays in the storage 110, the device adaptor processor 202 utilization for the RAID array (e.g., percent of I/O requests or utilization of the processor for each RAID array). The I/O manager 204 selects (at block 704) one or more RAID arrays having higher processor utilization than at least one other unselected RAID array, where a predetermined number of RAID arrays having the highest processor 202 utilization may be selected. The I/O manager 204 may then indicate (at block 706) in the message to the processor nodes 102*a* and/or 102*b* to only reduce the rate of I/O requests to the selected one or more RAID array, and not reduce the rate of I/O requests for those RAID arrays not specified for rate reduction.

With the described embodiments of FIG. 7, I/O request rate reduction is targeted toward those RAID arrays that are having the greatest impact on the device adaptor processor utilization, so that only I/O requests to those RAID arrays having the more significant impact on processor utilization are delayed. I/O requests to RAID arrays having less of an impact on device adaptor processor 202 utilization may not have their I/O request transmission rate reduced, because requests to those RAID arrays are not having as much impact on processor utilization.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product implemented in a storage controller for managing Input/Output ("I/O")requests to a storage, the computer program product comprising a computer readable storage medium having computer readable program code embodied therein that is executable to perform operations, the operations comprising:

determining whether processor utilization at a first processor implemented in a device adaptor in the storage controller receiving I/O requests to the storage from a second processor exceeds a utilization threshold, wherein the second processor manages I/O requests to the storage from at least one connected host, and wherein there are a plurality of logical storage units configured in the storage;

determining whether one of a plurality of critical operations is in progress at the first processor, wherein the plurality of critical operations include recovering from a failure at the storage and handling a failover to a device adaptor implementing the first processor from another device adaptor; and in response to determining that the one of the plurality of critical operations is in progress at the first processor and in response to determining that the processor utilization at the first processor exceeds the utilization threshold, performing:

determining a processor utilization at the device adaptor for each of the logical storage units;

selecting at least one logical storage unit causing higher processor utilization than at least one other logical storage unit; and sending, by the first processor, a message to the second processor to cause the second processor to reduce a rate at which I/O requests are transferred from the second processor to the selected at least one logical storage unit.

2. The computer program product of claim 1, wherein the processor utilization comprises a first processor utilization, wherein the operations further comprise:

determining by the first processor whether a second processor utilization at the first processor exceeds the utilization threshold after sending the message; and reducing, by the first processor, a rate at which the I/O requests from the second processor are processed at the first processor in response to determining that the second processor utilization exceeds the utilization threshold.

3. The computer program product of claim 2, wherein the sending the message to the second processor is to cause the second processor to reduce the rate at which requests are transferred to the first processor by at least one of adding a delay to service the requests at the second processor and reducing resources at the second processor allocated to service the requests.

4. The computer program product of claim 1, wherein a cache accessible by the second processor stores data for the storage, wherein the second processor reduces the rate at which the I/O requests are transferred to the device adaptor by performing at least one of:

reducing a number of tasks that are available to be allocated to stage read data from the storage to the cache and to destage modified data from the cache to the storage;

delaying processing of tasks to destage and stage data with respect to the cache;

increasing a cache usage threshold, wherein when an amount of data in the cache exceeds the cache usage threshold, data is demoted from the cache; and reduce prestaging of data from the storage to the cache for read requests.

5. The computer program product of claim 1, wherein the logical storage units in the storage comprises storage devices configured as Redundant Array of Independent Disks (RAID) arrays, and wherein one of the critical operations comprises rebuilding the RAID array on a replacement storage device for a failed storage device of the storage devices.

6. The computer program product of claim 1, wherein the logical storage units comprise storage arrays, wherein the operations further comprise:

determining a remaining fault tolerance comprising a number of remaining operational storage devices that can fail, excluding a failed storage device, and still allow recovery of data in the storage array; and determining a level of reduction of the rate at which I/O requests are transferred to the device adaptor from multiple levels of reduction based on the remaining fault tolerance, wherein the message sent to the second processor indicates the level of reduction to cause the second processor to reduce the rate at which I/O requests are transferred by the level of reduction.

7. The computer program product of claim 1, wherein the processor utilization comprises a first processor utilization, wherein the operations further comprise:

determining, by the device adaptor, whether a second processor utilization at the device adaptor exceeds the utilization threshold after sending the message;

in response to determining that the second processor utilization exceeds the utilization threshold, performing at least one of:

delay processing the I/O requests to the storage;

reduce a number of resources that are available to service the I/O requests to the storage; and reduce prefetching of read data from the storage in anticipation of expected read requests from the storage controller.

8. A system for managing Input/Output ("I/O") requests to a storage, comprising:

a first processor implemented in a device adaptor in a storage controller to manage I/O requests to the storage; and a second processor, wherein the second processor manages I/O requests to the storage from at least one connected host, and wherein there are a plurality of logical storage units configured in the storage;

wherein the first processor performs:

determining whether processor utilization at the first processor receiving I/O requests to the storage from the second processor exceeds a utilization threshold;

determining whether one of a plurality of critical operations is in progress at the first processor, wherein the plurality of critical operations include recovering from a failure at the storage and handling a failover to the device adaptor from another device adaptor; and in response to determining that the one of the plurality of critical operations is in progress at the first processor and in response to determining that the processor utilization at the first processor exceeds the utilization threshold, performing:

determining a processor utilization at the device adaptor for each of the logical storage units;

selecting at least one logical storage unit causing higher processor utilization than at least one other logical storage unit; and sending, by the first processor, a message to the second processor to cause the second processor to reduce a rate at which I/O requests are transferred from the second processor to the selected at least one logical storage unit.

9. The system of claim 8, wherein the processor utilization comprises a first processor utilization, wherein the operations further comprise:

determining by the first processor whether a second processor utilization at the first processor exceeds the utilization threshold after sending the message; and reducing, by the first processor, a rate at which the I/O requests from the second processor are processed at the first processor in response to determining that the second processor utilization exceeds the utilization threshold.

10. The system of claim 8, wherein a cache accessible by the second processor stores data from the storage, wherein the second processor reduces the rate at which the I/O requests are transferred to the device adaptor by performing at least one of:
    reducing a number of tasks that are available to be allocated to stage read data from the storage to the cache and to destage modified data from the cache to the storage;
    delaying processing of tasks to destage and stage data with respect to the cache;
    increasing a cache usage threshold, wherein when an amount of data in the cache exceeds the cache usage threshold, data is demoted from the cache; and
    reduce prestaging of data from the storage to the cache for read requests.

11. The system of claim 8, wherein the logical storage units in the storage comprise storage arrays, wherein the operations further comprise:
    determining a remaining fault tolerance comprising a number of remaining operational storage devices that can fail, excluding a failed storage device, and still allow recovery of data in the storage array; and
    determining a level of reduction of the rate at which I/O requests are transferred to the device adaptor from multiple levels of reduction based on the remaining fault tolerance, wherein the message sent to the second processor indicates the level of reduction to cause the second processor to reduce the rate at which I/O requests are transferred by the level of reduction.

12. The system of claim 8, wherein the processor utilization comprises a first processor utilization, wherein the operations further comprise:
    determining, by the device adaptor, whether a second processor utilization at the device adaptor exceeds the utilization threshold after sending the message;
    in response to determining that the second processor utilization exceeds the utilization threshold, performing at least one of:
    delay processing the I/O requests to the storage;
    reduce a number of resources that are available to service the I/O requests to the storage; and
    reduce prefetching of read data from the storage in anticipation of expected read requests from the storage controller.

13. A method for managing Input/Output ("I/O")requests implemented in a storage controller to a storage, comprising:
    determining whether processor utilization at a first processor implemented in a device adaptor in the storage controller receiving I/O requests to the storage from a second processor exceeds a utilization threshold, wherein the second processor manages I/O requests to the storage from at least one connected host, and wherein there are a plurality of logical storage units configured in the storage;
    determining whether a one of a plurality of critical operations is in progress at the first processor, wherein the plurality of critical operations include recovering from a failure at the storage and handling a failover to a device adaptor from another device adaptor; and
    in response to determining that the one of the plurality of critical operations is in progress at the first processor and in response to determining that the processor utilization at the first processor exceeds the utilization threshold, performing:
    determining a processor utilization at the device adaptor for each of the logical storage units;
    selecting at least one logical storage unit causing higher processor utilization than at least one other logical storage unit; and
    sending, by the first processor, a message to the second processor instructing the second processor to reduce a rate at which I/O requests are transferred from the second processor to the selected at least one logical storage unit.

14. The method of claim 13, wherein the processor utilization comprises a first processor utilization, further comprising:
    determining by the first processor whether a second processor utilization at the first processor exceeds the utilization threshold after sending the message; and
    reducing, by the first processor, a rate at which the I/O requests from the second processor are processed at the first processor in response to determining that the second processor utilization exceeds the utilization threshold.

15. The method of claim 13, wherein a cache accessible by the second processor stores data for the storage, wherein the second processor reduces the rate at which the I/O requests are transferred to the device adaptor by performing at least one of:
    reducing a number of tasks that are available to be allocated to stage read data from the storage to the cache and to destage modified data from the cache to the storage;
    delaying processing of tasks to destage and stage data with respect to the cache;
    increasing a cache usage threshold, wherein when an amount of data in the cache exceeds the cache usage threshold, data is demoted from the cache; and
    reduce prestaging of data from the storage to the cache for read requests.

16. The method of claim 13, wherein the logical storage units comprise storage arrays, further comprising:
    determining a remaining fault tolerance comprising a number of remaining operational storage devices that can fail, excluding a failed storage device, and still allow recovery of data in the storage array; and
    determining a level of reduction of the rate at which I/O requests are transferred to the device adaptor from multiple levels of reduction based on the remaining fault tolerance, wherein the message sent to the second processor indicates the level of reduction to cause the second processor to reduce the rate at which I/O requests are transferred by the level of reduction.

17. The method of claim 13, wherein the processor utilization comprises a first processor utilization, further comprising:
    determining, by the device adaptor, whether a second processor utilization at the device adaptor exceeds the utilization threshold after sending the message;
    in response to determining that the second processor utilization exceeds the utilization threshold, performing at least one of:
    delay processing the I/O requests to the storage;
    reduce a number of resources that are available to service the I/O requests to the storage; and reduce prefetching of read data from the storage in anticipation of expected read requests from the storage controller.

* * * * *